United States Patent
Becker et al.

(10) Patent No.: US 6,871,419 B1
(45) Date of Patent: Mar. 29, 2005

(54) DRYING DEVICE AND METHOD FOR PRODUCING THE SAME

(75) Inventors: Franz-Josef Becker, Neuwied (DE); Robert-Peter Klein, Neuwied (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 09/937,457

(22) PCT Filed: Mar. 9, 2000

(86) PCT No.: PCT/EP00/02041
§ 371 (c)(1), (2), (4) Date: Sep. 24, 2001

(87) PCT Pub. No.: WO00/57991
PCT Pub. Date: Oct. 5, 2000

(30) Foreign Application Priority Data

Mar. 26, 1999 (DE) .......................... 199 13 761

(51) Int. Cl.[7] ................................. F26B 5/16
(52) U.S. Cl. ..................... 34/416; 34/DIG. 1; 34/472; 34/473
(58) Field of Search .................... 34/307, 310, 352, 34/416, 417, 414, 419, 472, 473, 474, DIG. 1; 427/372.2, 533, 331; 252/194; 428/351

(56) References Cited

U.S. PATENT DOCUMENTS

| | | | | |
|---|---|---|---|---|
| 2,210,862 A | * | 8/1940 | Tronstad .......................... 34/1 |
| 3,572,008 A | * | 3/1971 | Hankinson ....................... 55/33 |
| 4,068,387 A | * | 1/1978 | Manos ............................. 34/9 |
| 4,357,557 A | * | 11/1982 | Inohara et al. ............... 313/509 |
| 4,536,198 A | * | 8/1985 | Strain ............................. 55/33 |
| 4,645,519 A | | 2/1987 | Fraioli et al. |
| 4,645,698 A | * | 2/1987 | Matsubara .................... 428/68 |
| 5,091,358 A | * | 2/1992 | Birbara et al. ............... 502/412 |
| 5,104,594 A | * | 4/1992 | Hillemeier .................... 264/25 |
| 5,304,419 A | * | 4/1994 | Shores ........................ 428/355 |
| 5,401,536 A | * | 3/1995 | Shores ........................ 427/294 |
| 5,698,217 A | * | 12/1997 | Wilking ....................... 424/448 |
| 5,707,739 A | * | 1/1998 | Wellinghoff et al. ......... 428/403 |
| 5,746,937 A | * | 5/1998 | McKedy et al. ......... 252/188.28 |
| 5,833,070 A | * | 11/1998 | Mizuno et al. .......... 206/524.4 |
| 6,066,404 A | * | 5/2000 | Suzuura et al. ............. 428/516 |
| 6,103,141 A | * | 8/2000 | Incorvia et al. ............. 252/194 |
| 6,112,888 A | * | 9/2000 | Sauro et al. ................. 206/204 |
| 6,139,935 A | * | 10/2000 | Cullen et al. ................. 428/68 |
| 6,226,888 B1 | * | 5/2001 | Lang ........................... 34/332 |

FOREIGN PATENT DOCUMENTS

| | | |
|---|---|---|
| DE | 196 46 048 A1 | 5/1998 |
| WO | WO 98/17711 | 4/1998 |
| WO | WO 00/06663 | 2/2000 |

* cited by examiner

Primary Examiner—Kenneth Rinehart
(74) Attorney, Agent, or Firm—Frommer Lawrence & Haug LLP

(57) ABSTRACT

The invention relates to a flat and activable drying device for reducing the moisture content of a gas space surrounding said device and to a method for producing a device of this type. The inventive drying device contains a flat matrix with at least one regenerable drying agent.

24 Claims, 2 Drawing Sheets

Figure 2:
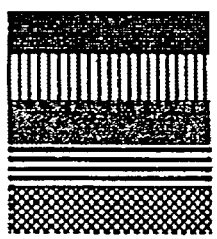

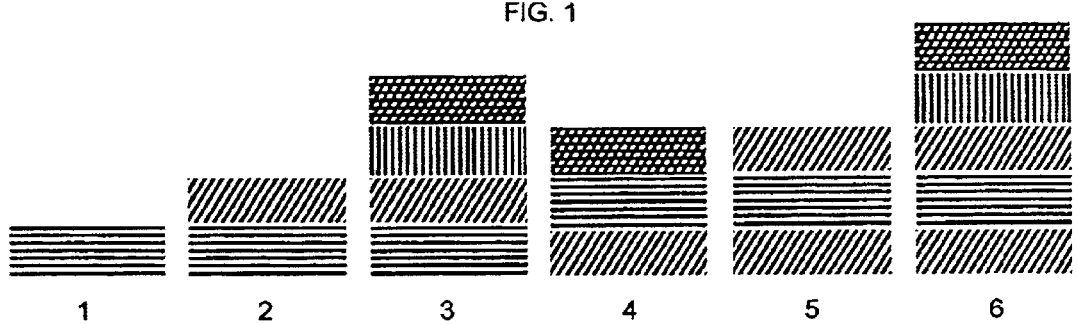
FIG. 1
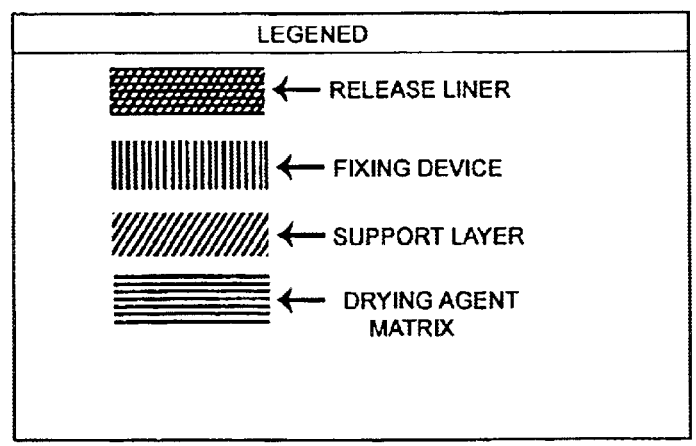

← release liner
← pressure sensitive adhesion layer
← backing layer
← desiccant matrix
← water vapor permeable layer

DRYING DEVICE AND METHOD FOR PRODUCING THE SAME

The invention is directed to a device capable of reducing the moisture content, and/or ensuring a defined moisture content, in a closed gas space surrounding said device, to a process for producing such a device, and to the use of said device.

Such drying devices are known in the prior art. They can comprise desiccant-filled containers which are used, for example, for dry storage of moisture-sensitive products.

A desiccant pouch is known which is available commercially under the name Desimax™ from the company Multiform Desiccant Inc. (Buffalo, New York). This type of desiccant pouch consists of two pouch walls which enclose an interior space by means of weld seams at the edge of the pouch walls. Said interior space contains a defined amount of desiccant, namely 4 Å molecular sieve. The pouch walls themselves are at least partly permeable to water vapor.

The disadvantage of such a system is that the defined, limited amount of desiccant present in the pouch interior space corresponds to only a defined, limited moisture absorption capacity. If the amount of desiccant is exhausted by attainment of the maximum absorption capacity for moisture (i.e., essentially water), the desiccant pouch remains ineffective. Further absorption of moisture/water is impossible, and nor is it possible to ensure a constant atmospheric humidity, in particular a reduced atmospheric humidity, in a closed gas space surrounding said desiccant pouch.

In the processing of such desiccant pouches, therefore, the problem occurs that prolonged contact (for example, several minutes) with the ambient air, which generally contains more than 40% relative atmospheric humidity, must be avoided, since otherwise rapid exhaustion occurs, so rendering the desiccant pouch unusable for its subsequent utility in, for example, the production of packaging for moisture-sensitive products. A solution to this problem is either to carry out processing in rooms with constant, greatly reduced relative atmospheric humidity which are closed to the outside, or to accelerate the processing steps which are performed during contact with the ambient air.

In addition, desiccant pouches are not very multifaceted in terms of their usefulness for different drying needs, since the amount of desiccant per pouch (and thus the maximum moisture/water absorption capacity) is limited by the internal volume.

A further disadvantage of desiccant-filled pouches is that the desiccant is present within such a pouch in a solid, usually granulated or powdered form. At the filling stage, therefore, there is first of all a need for very precise metering of the desiccant during the production process. However, when such a system comes under relatively severe mechanical stress, there is a risk that the pouch wall or the weld seam at the edge of the pouch will tear open and that the desiccant will exit. Where the desiccant is not harmless, or may enter into chemical reactions with the product that is to be stored under reduced and/or defined moisture content conditions in a surrounding, closed gas space, therefore, a desiccant pouch of this kind also constitutes a certain safety risk for said product.

DE 196 46 048 discloses packaging for transdermal therapeutic systems, having internally fixed drying devices. This desiccant-containing packaging comprises multilayer laminates. With the aid of a pressure-sensitively adhesive layer, a desiccant layer present therein can be fastened to the assembly comprising the other layers of the laminate. Like the desiccant pouch already described, this packaging is also subject to the rapid exhaustion of the moisture/water absorption capacity in the case of prolonged contact with normal ambient air. By normal ambient air is meant air which does not have a reduced relative atmospheric humidity but instead has at least 40% relative atmospheric humidity. Consequently, processing of these packaging laminates likewise requires process steps within a room closed off with respect to the environment, and/or working in a room with reduced reduced atmospheric humidity.

It is an object of the present invention to provide a device for reducing the moisture content of a closed gas space surrounding said device, or for establishing a defined relative atmospheric humidity, which avoids these disadvantages of the drying devices known in the prior art. The intention is in particular to avoid the need for processing and/or storage beforehand in a closed gas space of reduced moisture content surrounding the device, and/or processing under conditions which are extremely limited in terms of time.

This object is achieved by means of a drying device which comprises a matrix with a desiccant present in it and which can be activated under industrially relevant conditions. If desired, the drying device may include a water-vapor-permeable layer. The matrix can, if desired, be lined directly with this layer. The desiccant comprises a regenerable desiccant. The drying device of the invention and, in particular, the desiccant matrix are preferably in sheet form. In one particular embodiment, the desiccant matrix of said drying device is or has a pressure-sensitively adhesive layer.

For the purposes of the invention, the matrix is a carrier for the desiccant Suitable materials for said matrix are in principle organic and inorganic materials, especially polymeric materials. The matrix materials must possess the capacity to admit the penetration of water molecules into the material and the migration of these molecules within the material. On the other hand, this incoming water must not result in complete dissolution of the polymeric material. Examples of suitable materials are polymeric substances such as acrylates, silicones, polyisobutylenes, SIS rubber, SBS rubber, SEBS rubber, polyvinylpyrrolidone, polyurethane, polyesters, polyethylene, polyvinyl alcohol, polyamides, ethylene-vinyl acetate, polyacrylic acid, Kollidon (copolymer of vinyl acetate and vinylpyrrolidone), and cellulose derivatives. In principle, any film-forming materials can be used. It is of course also possible to use mixtures of the organic polymer materials mentioned. The matrix is free from pharmaceutical active substances.

The matrix is preferably in sheet form. This means that in the spatial conformation of this matrix the three dimensions (height, length and width) are in defined proportions with respect to one another. The height of the sheet-form matrix has a minimum value of about 50 $\mu$m and a maximum value of about 3 mm; the height of the sheet-form matrix is preferably between 200 and 500 $\mu$m.

The width and length of the sheet-form matrix are not critical parameters, but can be adapted to the practical requirements in each case. Approximately 2 mm can be regarded as a minimum value of the width for practical handleability of the sheet-form matrix. The width of the sheet-form matrix is preferably between about 1 and about 50 cm, with particular preference between about 2 and about 10 cm.

Like the width, the length of the sheet-form matrix can likewise in theory be infinite. For the reason of more simple handleability, preferred lengths are likewise between about 1 and about 50 cm, with particular preference between about 2 and about 10 cm. In one embodiment the desiccant matrix is elastic, by which is understood the capacity for the matrix to exhibit a reversible change of shape. This results in an improvement in certain properties of the matrix, for example, the softness, the pliability, the flexibility and the machineability. For this purpose it is necessary to add substances to the matrix that are able to influence said properties. Such substances include plasticizers (elasticizers) for the respective matrix materials. Examples of suitable plasticizers are polyethylene glycol, polypropylene glycol, glycerol, Miglyol, propanediol, triglycerides, esters such as diethyl phthalate, tributyl citrate, etc., which are added to the matrix if desired in amounts such that the desired elasticity is obtained. This is of course dependent in particular on the nature of the respective matrix material and on the nature of the respective plasticizer, although the other constituents of the desiccant matrix may also have certain influences on the elasticity, so that it is not possible to specify exact limits for the quantitative proportions. Preferably, however, quantitative proportions of from about 1 to 40% plasticizer are present in the matrix (based on the overall weight of the matrix).

In another embodiment the desiccant matrix can be pressure-sensitively adhesive, by which is meant the ability for the matrix, once pressed onto a surface with a certain pressure, to be permanently bonded to said surface. For this purpose it may be necessary to add substances to the matrix which influence this property. Such substances include tackifiers (tackifier resins). Appropriate tackifiers are known to the skillled worker: examples are rosin esters and hydrogenated esters of rosin, hydrocarbon resins, etc., which are added, if desired, to the matrix in amounts such that the desired pressure-sensitive adhesive property is obtained. When choosing the amount of tackifier it is necessary to take account of the specific matrix materials. Here again, the other constituents of the desiccant matrix may have influences on the pressure-sensitive adhesion property, and so it is not possible to specify exact limits for the quantitative proportions. The ranges of amounts are therefore in general between about 5 and 70% tackifier in the matrix. Preferably, quantitative proportions of from about 10 to 30% tackifier are present in the matrix (based on the overall weight of the matrix).

In the embodiment in which the drying device comprises a pressure sensitively adhesive layer, or, even, where the desiccant matrix itself is pressure-sensitively adhesive, said drying device judiciously includes an abhesive backing layer (release liner) which covers this pressure-sensitively adhesive layer and from which the drying device is peeled off prior to its use. The materials for such backing layers are known to the skilled worker and can, for example, comprise films containing substances such as polyethylene terephthalate, polyethylene, polypropylene, paper, and modifications thereof.

As already mentioned, the drying device may further comprise a water vapor-permeable layer. If desired, the matrix can be lined with this layer. The water-vapor-permeable layer can be present on one or both sides of the sheet-form matrix. Appropriate materials for a water-vapor-permeable protective layer of this kind are, for example, cellulose in the form of film, nonwoven, paper, perforated film, etc.

In a further embodiment, the drying device may also include a support layer. The purpose of this layer is to give the drying device greater dimensional stability. This may be the case, for example, when the desiccant matrix itself, owing to very low thickness or relatively high elasticity, is too flexible for practical handleability. The support layer can, if desired, line the matrix or may even be identical with the water-vapor-permeable layer. The support layer can be on one or both sides of the sheet-form matrix. Appropriate materials for such a support layer are materials known to the skilled worker, such as PET film, polyethylene, polypropylene, paper, nonwovens, etc.

If desired, the drying device may also include a protective layer which is intended to protect the desiccant matrix against external mechanical stress, e.g., abrasion, or against the exit of desiccant. If desired, this layer can be identical with the water-vapor-permeable layer and/or with the support layer. Appropriate materials for the protective layer are materials known to the skilled worker, e.g., polymers such as polyethylene, polypropylene, paper, nonwovens, etc.

It is possible for the drying device to include a layer which fulfills at least two of the technical functions of water-vapor-permeable layer, support) layer, and protective layer.

If desired, the desiccant matrix may also include a moisture indicator whose color depends on the water content and which thus indicates whether the desiccant present in the matrix is still capable of further absorption of water. Examples of suitable moisture indicators of this type are copper(II) salts or cobalt(II) salts such as $CUSO_4$ or $CoCl_2$, for example.

For the purposes of the invention, a desiccant is a substance which is able to absorb moisture, but especially water. The ability of such substances to absorb moisture may be based on a chemical or physical effect. Regenerable desiccants—i.e., substances capable under certain conditions of releasing absorbed moisture (for example water) again and thereby undergoing transition to a state in which the substance is capable of renewed moisture absorption— are particularly suitable for the invention. Appropriate regenerable desiccants are $CaSO_4$ (calcium sulfate, anhydrous gypsum, anhydrite), $CaSO_4 \cdot \frac{1}{2}H_2O$ (hemihydrate), $CaCl_2$, $Al_2O_3$, $CaO$, $Na_2SO_4$, $K_2CO_3$, $CuSO_4$, $Mg(ClO_4)_2$, $MgSO_4$, silica gel (blue indicator gel), polyvinylpyrrolidone (PVP), and mixtures of at least two of these substances.

In accordance with the invention, these substances are used as solids or as a solution. The physical form is not particularly important: it may comprise crystals, powders, amorphous solids, granules, triturated forms, etc. However, the size of these desiccant solids is limited by the requirements for the thickness of the sheet-form matrix. An upper limit for the size of the solid particles is therefore about 200 $\mu$m; however, preference is given to the use of particles having a grain size below 50 $\mu$m. The minimum grain size of these particles is 1 $\mu$m.

The amount of desiccant in the matrix depends primarily on the desired moisture/water absorption capacity of the drying device in question and on the moisture/water absorption capacity of the particular desiccant used.

If, for example, only a low water absorption capacity is required, the use of a desiccant of low water absorption capacity in a small amount in the desiccant matrix may be sufficient. A small amount of desiccant (in active form) close to the lower limit, in the matrix might represent, for example, from about 0.5 to 5% of the overall weight of the desiccant matrix. In that case, the thickness and surface area of the desiccant matrix may even be situated at the respective lower limits.

Where the required water absorption capacity of the drying device is very high, however, it is necessary to use a desiccant matrix containing a relatively large amount of desiccant, the desiccant as well being required to possess a high water absorption capacity. A large amount of desiccant (in active form) of this kind may represent, for example, from about 50 to 70% of the overall weight of the desiccant matrix.

The drying device as such is activatable. This means that the article in its entirety, but of course in particular the desiccant matrix, is stable with respect to the conditions under which the desiccant present in the matrix is regenerated. There must be no irreversible decomposition of individual components or permanent deformation owing, for example, to instances of material softening. This is ensured by using materials which possess resistance to increased temperatures, thermal radiation, or microwaves.

The actual activation of the drying device, or of the desiccant matrix, can be done by various means. The most simple type of activation is to store the desiccant matrix under increased temperature (for example, at 105, 110, 120, 140 or 170° C.) for a defined period. The higher the chosen temperature, the shorter the required storage period. Other possibilities for activation can consist in the use of infrared radiation or microwave irradiation.

As additional measures, a reduced external pressure (for example 0.2 atm) and/or an artificially generated air circulation may facilitate the chosen activating conditions (for example, temperature, duration, radiation intensity). The application of these additional measures may also mean that in the case of increased-temperature activation this temperature need not be above 100° C., the boiling point of water under standard conditions, but may even be from about 60 to 80° C.

As a result of activation, the regenerable desiccant undergoes transition to its active form, in which it possesses the capacity to absorb moisture/water.

It is clear that when choosing the activation method, which may also consist in a combination of different activation methods and additional measures, it is necessary to take account of the materials present in each case in the drying device and/or in the desiccant matrix and of the properties of said materials (sensitivity to infrared or microwave radiation and/or increased temperatures). Otherwise, it may be necessary to adapt the materials of the desiccant matrix and/or of the drying device to the required activating conditions. In addition, it may be necessary to adapt the economy of the activation method to the material costs of the drying device.

Specific embodiments of a desiccant matrix are sheet-form systems, by which are meant, for example, labels, films, tapes, rolls, stickers, or disks.

The advantages of the drying device of the invention are, inter alia, that the desired moisture/water absorption capacity of the drying device can be adapted to the particular need by means of simple calculation of its surface area and, if appropriate, of its thickness and of the concentration of the desiccant in the matrix. This is based on the fact that the water absorption capacity of the drying device, at constant thickness and constant concentration of desiccant in the matrix, is generally in a linear correlation with its surface area. If the water absorption capacity of a drying device used is exhausted, a greater drying requirement might be able to be supplemented by simply adding an additional, readily calculable surface area to the drying device of the invention.

The drying device of the invention is used to reduce the moisture content of a closed gas space surrounding said device or to maintain a defined, preferably a reduced, moisture content in a closed gas space surrounding said device. It can therefore be utilized in a method of reducing the moisture content of a closed gas space surrounding said device or of maintaining a defined, preferably a reduced, moisture content in a closed gas space surrounding said device.

Said gas space must be gastightly closed so that there can be no exchange with ambient air and the atmospheric humidity from the surroundings which it contains. Closed gas spaces of this kind may be, for example, airtight packaging of products.

The possibilities for application of the drying device of the invention are therefore located within the field of the packaging of moisture-sensitive articles, such as, for example, foods, drugs, diagnostic agents, medicaments, moisture-sensitive chemicals, and biologically activatable material. Preference is given to the use of drying devices of the invention within packaging for tablets, transdermal therapeutic systems, and sheet-form form pharmaceutical administration forms for oral use.

Where the desiccant present in the matrix possesses the ability to bind molecules of substances other than water (i.e., for example, organic solvents such as ethanol, methanol, etc., odorous substances such as acetaldehyde, acetic acid, etc., gaseous substances such as $CS_2$, $NH_3$, $H_2S$ etc.), a target utility can consist in reducing the amount of such molecules in the gas space surrounding the drying device and/or in keeping said gas space substantially free from such molecules.

The production and performance of the drying device of the invention will be elucidated on the basis of the following examples.

Example 1

347.84 g of 2-propanol are mixed with
46.36 g of polyethylene glycol 400 and
81.4 g of Kollidon 90 and the mixture is homogenized with stirring.
Subsequently
127.5 g of calcium sulfate $\times 2H_2O$ are introduced and the mixture is homogenized at high stirring speed.

The resultant, solvented desiccant composition is coated onto a 23 $\mu$polyester film so as to give, following evaporation of the solvent, a desiccant layer of 200 g/m². The open side of the desiccant layer is laminated with a 26 g/m² paper. Punched specimens measuring 10 cm² are produced and are activated at 100° C. for 5 hours.

Example 2

347.84 g of 2-propanol are mixed with
46.36 g of polyethylene glycol 400 and
81.4 g of Kollidon 90 and the mixture is homogenized.
127.5 g of calcium sulfate $\times 2H_2O$ are introduced into the homogeneous solution, and the mixture is homogenized at high stirring speed.

The resultant, solvented desiccant composition is coated onto a 23$\mu$ polyester film so as to give, following evaporation of the solvent, a desiccant layer of 200 g/m². In a separate coating operation, the commercial pressure-sensitive adhesive Durotak 387-2287 (manufacturer: National Starch & Chemical) is coated onto a single-sidedly abhesive polyester film so as to give, following evaporation of the solvent, a pressure-sensitive adhesive coat of 20 g/m². The open side of the pressure-sensitive adhesive coat is laminated with the polyester side of the desiccant coat. Punched specimens measuring 10 cm² are produced and are activated at 105° C. for 5 hours.

Example 3

Five each of the punched specimens produced by the processes described in Example 1 and in Example 2 are subjected to a test to determine the water absorption capacity. For this purpose, following initial activation in a desiccator, the punched specimens were stored over supersaturated calcium nitrate solution (≙ 55% relative humidity) for at least 24 hours. The water absorption which has taken place is determined by weighing the punched specimens at defined intervals of time.

After 24 hours, there was a slow decrease in the water absorption capacity of these specific drying devices. The punched specimens were reactivated under the conditions specified in Example 1 and, respectively, in Example 2 and were subjected to a second test to determine the water absorption capacity.

Table 1 shows the results of these experiments on the water absorption of the drying devices of the invention. It can be ascertained that the water absorption takes place continuously over a period of at least 24 hours.

TABLE 1

| | 1 hour | 2 hours | 4 hours | 6 hours | 24 hours |
|---|---|---|---|---|---|
| Water absorption (mg) $\overline{X}$ n = 5 after storage | | | | | |
| Example 1 | 6.90 | 10.10 | 12.22 | 13.72 | 17.64 |
| Example 2 | 4.74 | 7.28 | 9.38 | 11.38 | 15.52 |
| Water absorption after reactivation (mg) $\overline{X}$ n = 5 after storage | | | | | |
| Example 1 | 7.30 | 8.78 | 10.28 | 10.98 | 14.78 |
| Example 2 | 6.62 | 8.28 | 10.30 | 11.14 | 15.18 |

The drying capacity of the drying device of the invention is therefore not restricted (as in the case of the prior art drying devices) to one-off and/or short-duration drying.

The experiment of Example 3 also shows, however, that the drying device of the invention can be used to perform a method of reducing the moisture content of a closed gas space and/or maintaining a reduced moisture content of a closed gas space, which comprises in a first step converting an activatable drying device, comprising a sheet-form matrix having at least one regenerable desiccant, by activation into the active state, in a further step placing the activatable drying device in the active state into the gas space whose moisture content is to be reduced and/or whose reduced moisture content is to be maintained, in a further step airtightly closing said gas space with respect to the surroundings; finally, in a further step, the activatable drying device in the active state absorbs moisture from the airtightly closed gas space over a prolonged period of, for example, at least one hour.

FIG. 1 shows different embodiments of the activatable drying device of the invention. The different elements are explained in the attached legend. The figure depicts:
1=activatable drying device consisting of a desiccant matrix.
2=activatable drying device consisting of a desiccant matrix and a support layer.
3=activatable drying device consisting of a release liner, a fixing 1=, means, a support layer, and a desiccant matrix.
4=activatable drying device consisting of a release liner, a desiccant matrix, and an underlying support layer.
5=activatable drying device consisting of a desiccant matrix surrounded by two support layers.
6=activatable drying device consisting of the assembly of release liner, a fixing means, and a desiccant matrix surrounded by two support layers.
FIG. 12 demonstrates an embodiment of an activatable drying device according to the invention.

What is claimed is:

1. An adhesive, activatable sheet-form drying device, comprising:
   a desiccant polymeric matrix containing a regenerable desiccant agent therein and having pressure-sensitive adhesive properties;
   a support layer disposed on one side of said matrix; and
   a release liner disposed on the other side of said matrix wherein the support layer is water-vapor-permeable.

2. The adhesive, activatable sheet-form drying device according to claim 1, wherein the polymeric matrix comprises at least one polymeric material selected from the group consisting of acrylates, silicones, polyisobutylens, SIS rubber, SEBS rubber, polyvinylpyrrolidone, polyurethane, polyesters, polyethylene, polyvinylalcohol, polyamides, ethylene-vinylacetate, polyacrylic acid, kollidon and cellulose derivatives thereof.

3. The adhesive, activatable sheet-form drying device according to claim 1, wherein the regenerative desiccant is selected from the group consisting of $CaSO_4$, $CaSO_4\cdot\frac{1}{2}H_2O$, $CaCl_2$, $Al_2O_3$, $CaO$, $Na_2SO_4$, $K_2CO_3$, $CuSO_4$, $Mg(ClO_4)_2$, $MgSO_4$, silica gel and polyvinylpyrrolidone.

4. The adhesive, activatable sheet-form drying device according to claim 1, wherein the water-vapor-permeable layer comprises a material selected from the group consisting of paper, cellulose, nonwovens and perforated films.

5. The adhesive, activatable sheet-form drying device according to claim 1, wherein the release liner comprises a material selected from the group consisting of films containing polyethylene terephthalate, polyethylene, polypropylene, paper and modifications thereof.

6. The adhesive, activatable sheet-form drying device according to claim 1, wherein the polymeric matrix further comprises one or more plasticizers selected from the group consisting of polyethylene glycol, polypropylene glycol, glycerol, miglyol, propane diol, triglycerides, diethyl phthalate and tributyl citrate.

7. The adhesive, activatable sheet-form drying device according to claim 1, wherein the polymeric matrix further comprises one or more tackifiers selected from the group consisting of rosin esters, hydrogenated rosin esters and hydrocarbon resins.

8. The adhesive, activatable sheet-form drying device according to claim 1, wherein the polymeric matrix further comprises a moisture indicator selected from the group consisting of copper (II) salts and cobalt (II) salts.

9. The adhesive, activatable sheet-form drying device according to claim 8, wherein the desiccant comprises solid particles having a size from 1 to 50 μm.

10. The adhesive, activatable sheet-form drying device according to claim 1, wherein the desiccant comprises solid particles having a size of from 1 to 200 μm.

11. An adhesive, activatable sheet-from drying device, comprising:
    a desiccant polymeric matrix containing a regenerable desiccant therein;
    a support layer disposed on one or both sides of said matrix;
    a pressure-sensitive adhesive layer; and
    a release liner covering said pressure-sensitive adhesive layer wherein one or both support layer, art water-vapor-permeable.

12. The adhesive, activatable sheet-form drying device according to claim 11, wherein the polymeric matrix comprises at least one polymeric material selected from the group consisting of acrylates, silicones, polyisobutylens, SIS rubber, SEBS rubber, polyvinylpyrrolidone, polyurethane, polyesters, polyethylene, polyvinylalcohol, polyamides, ethylene-vinylacetate, polyacrylic acid, kollidon and cellulose derivatives thereof.

13. The adhesive, activatable sheet-form drying device according to claim 11, wherein the regenerative desiccant is selected from the group consisting of $CaSO_4$, $CaSO_4 \cdot \frac{1}{2}H_2O$, $CaCl_2$, $Al_2O_3$, $CaO$, $Na_2SO_4$, $K_2CO_3$, $CuSO_4$, $Mg(ClO_4)_2$, $MgSO_4$, silica gel and polyvinylpyrrolidone.

14. The adhesive, activatable sheet-form drying device according to claim 11, wherein the water-vapor-permeable layer comprises a material selected from the group consisting of paper, cellulose, nonwovens and perforated films.

15. The adhesive, activatable sheet-form drying device according to claim 11, wherein the support layer comprises a material selected from the group consisting of polyethylene terephthalate, polyethylene, polypropylene, paper and nonwovens.

16. The adhesive, activatable sheet-form drying device according to claim 11, wherein the release liner comprises a material selected from the group consisting of films containing polyethylene terephthalate, polyethylene, polypropylene, paper and modifications thereof.

17. The adhesive, activatable sheet-form drying device according to claim 11, wherein the polymeric matrix further comprises one or more plasticizers selected from the group consisting of polyethylene glycol, polypropylene glycol, glycerol, miglyol, propane diol, triglycerides, diethyl phthalate and tributyl citrate.

18. The adhesive, activatable sheet-form drying device according to claim 11, wherein the polymeric matrix further comprises one or more tackifiers selected from the group consisting of rosin esters, hydrogenated rosin esters and hydrocarbon resins.

19. The adhesive, activatable sheet-form drying device according to claim 11, wherein the polymeric matrix further comprises a moisture indicator selected from the group consisting of copper (II) salts and cobalt (II) salts.

20. The adhesive, activatable sheet-form drying device according to claim 11, wherein the desiccant comprises solid particles having a size of from 1 to 200 $\mu$m.

21. The adhesive, activatable sheet-form drying device according to claim 20, wherein the size of the solid particles is from 1 to 50 $\mu$m.

22. A method of reducing moisture content and/or maintaining a reduced moisture content in a closed gas space surrounding a drying device comprising the steps of:
   a) converting an activatable drying device as claimed in claim 1 or 11 by activation into an active state;
   b) placing the activated drying device obtained according to step a) above into the gas-space whose moisture content is to be reduced and/or whose reduced moisture content is to be maintained;
   c) airtightly closing said gas space with respect to the surroundings.

23. The method according to claim 22, wherein a closed gas space is formed by an air tight packaging of moisture-sensitive articles.

24. The method according to claim 23, wherein the moisture-sensitive articles are selected from the group consisting of tablets, transdermal therapeutic systems and sheet-form pharmaceutical administration forms for oral use.

* * * * *